(12) United States Patent
Ciarafoni et al.

(10) Patent No.: US 9,309,394 B2
(45) Date of Patent: *Apr. 12, 2016

(54) POLYOLEFIN MASTERBATCH AND COMPOSITION SUITABLE FOR INJECTION MOLDING

(75) Inventors: Marco Ciarafoni, Ferrara (IT); Paola Massari, Ferrara (IT); Gisella Biondini, Portomaggiore (IT); Roberto Pantaleoni, Ferrara (IT); Sander Willems, Frankfurt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 288 days.

This patent is subject to a terminal disclaimer.

(21) Appl. No.: 13/202,738

(22) PCT Filed: Mar. 19, 2010

(86) PCT No.: PCT/EP2010/053621
§ 371 (c)(1),
(2), (4) Date: Aug. 22, 2011

(87) PCT Pub. No.: WO2010/108866
PCT Pub. Date: Sep. 30, 2010

(65) Prior Publication Data
US 2012/0035327 A1 Feb. 9, 2012

Related U.S. Application Data

(60) Provisional application No. 61/211,174, filed on Mar. 27, 2009.

(30) Foreign Application Priority Data

Mar. 23, 2009 (EP) .................... 09155831

(51) Int. Cl.
C08L 23/00 (2006.01)
C08L 23/10 (2006.01)
C08L 23/12 (2006.01)
C08L 23/14 (2006.01)

(52) U.S. Cl.
CPC ................. C08L 23/10 (2013.01); C08L 23/12 (2013.01); C08L 23/14 (2013.01); C08L 2205/02 (2013.01)

(58) Field of Classification Search
CPC .......... C08L 23/10; C08L 23/12; C08L 23/14
See application file for complete search history.

(56) References Cited

U.S. PATENT DOCUMENTS

| 4,399,054 | A | 8/1983 | Ferraris | |
|---|---|---|---|---|
| 4,439,573 | A * | 3/1984 | Fukui et al. | 524/451 |
| 4,469,648 | A | 9/1984 | Ferraris | |
| 6,573,334 | B1 * | 6/2003 | Pitteri et al. | 525/240 |
| 6,586,531 | B2 * | 7/2003 | Washiyama et al. | 525/240 |
| 8,008,400 | B2 * | 8/2011 | Pelliconi et al. | 525/191 |
| 2006/0194924 | A1 * | 8/2006 | Pelliconi | 525/240 |
| 2009/0030098 | A1 * | 1/2009 | Cagnani et al. | 521/134 |
| 2012/0178882 | A1 * | 7/2012 | Massari et al. | 525/240 |
| 2013/0123432 | A1 * | 5/2013 | Ciarafoni et al. | 525/240 |

FOREIGN PATENT DOCUMENTS

| CN | 1639251 A | 7/2005 |
|---|---|---|
| EP | 0045977 | 2/1982 |
| EP | 0361494 | 9/1989 |
| EP | 0728769 | 8/1996 |
| EP | 0782587 | 7/1997 |
| EP | 0395083 | 11/1997 |
| EP | 1901922 | 3/2008 |
| EP | 1272533 | 9/2008 |
| WO | WO-9844001 | 10/1998 |
| WO | WO-0063261 | 10/2000 |
| WO | WO-0228958 | 4/2002 |
| WO | WO-02051912 | 7/2002 |
| WO | WO-03076511 A1 | 9/2003 |
| WO | WO-2004087805 | 10/2004 |
| WO | WO-2007003523 | 1/2007 |
| WO | WO-2007006657 | 1/2007 |

* cited by examiner

Primary Examiner — Irina Krylova

(57) ABSTRACT

A masterbatch composition comprising:
70-90% wt of a component (A) being a propylene homopolymer or copolymer of propylene with ethylene or $C_4$-$C_{10}$ alpha olefins, having a $MFR^A$ according to ISO 1133 (230° C./2.16 Kg) ranging from 15 to 70 g/10 min; and
10-30% wt of a component B) being a propylene-ethylene copolymer comprising 25-45% wt of ethylene derived units and having a value of the intrinsic viscosity [η] of the fraction soluble in xylene at room temperature ranging from 5 to 9 dl/g, said masterbatch composition having a total MFR higher than 4 g/10 min, and a value of the flexural modulus measured according to ISO method 178 ranging from 950 to 2000 MPa.

4 Claims, No Drawings

POLYOLEFIN MASTERBATCH AND COMPOSITION SUITABLE FOR INJECTION MOLDING

This application is the U.S. national phase of International Application PCT/EP2010/053621, filed Mar. 19, 2010, claiming priority to European Application 09155831.2 filed Mar. 23, 2009 and the benefit under 35 U.S.C. 119(e) of U.S. Provisional Application No. 61/211,174, filed Mar. 27, 2009; the disclosures of International Application PCT/EP2010/053621, European Application 09155831.2 and U.S. Provisional Application No. 61/211,174, each as filed, are incorporated herein by reference.

The present invention relates to a polyolefin masterbatch which can be used to prepare polyolefin compositions suitable for injection molding into relatively large articles. More particularly, the polyolefin compositions can be injection molded into large objects which exhibit improved surface properties, particularly with respect to reduction of tiger striping and gels.

Polypropylene and thermoplastic polyolefins have enjoyed wide commercial acceptance because of their outstanding cost/performance characteristics. For example, these polymers are used in molded-in color applications because of their good weatherability.

Polypropylene and thermoplastic polyolefins are generally injection molded into a variety of desired articles. The injection molding technique for obtaining relatively large parts such as automobile bumpers and fascia, offer particularly challenging problems such as cold flow, tiger striping and gels. "Cold flow" occurs when the molten polymer being injected into a mould begins to cool and solidify before the mould is completely filled with the polymer. "Tiger striping" refers to color and gloss variations on the surface of an injection molded article, which occurs because of unstable mold filling properties of the molten polymer as it is being injected into the mold and formed into the desired shape. "Gels" refers to small dots appearing at the surface of the final shaped article, due to relatively poor dispersion of one or more polymeric components. Such gels, together with tiger stripes, have the effect of worsening the surface appearance of the final shaped article.

Various proposals have been made in the art in order to improve the physical characteristics of injection molding articles.

According to WO 2004/087805, a particularly good balance of melt flowability, mechanical properties and surface properties, with particular reference to reduction of tiger stripes, is achieved by adding to a polyolefin matrix a masterbatch composition having a Melt Flow Rate (MFR) measured according to ISO 1133 (230° C./2.16 Kg) ranging from 0.1 to 10, preferably from 0.1 to 5 g/10 min, having a flexural modulus value up to 930 MPa and comprising (percent by weight):

A) 50%-90% of a crystalline polypropylene component containing from 25% to 75% of a fraction $A^I$ having a melt flow rate $MFR^I$ of from 0.1 to 10 g/10 min., and from 75% to 25% of a fraction $A^{II}$ having a melt flow rate $MFR^{II}$ equal to or lower than 100 gr/10 min; wherein the ratio $MFR^I/MFR^{II}$ is from 5 to 60; and B) 10%-50% of a copolymer component of ethylene and at least one $C_3$-$C_{10}$ α-olefin, the copolymer containing from 15 to 50% of ethylene; said masterbatch composition having a value of the intrinsic viscosity [η] of the fraction soluble in xylene at room temperature equal to or higher than 3.5 dl/g.

A critical aspect associated to the use of the masterbatch composition described above is the dispersion in the polyolefin matrix, which, if not optimal, is responsible of the presence of a relevant number of gels in the final shaped articles. It is therefore an object of the present invention is to provide a masterbatch composition with a particularly valuable set of physical and mechanical properties being particularly suitable to be dispersed in the polyolefin compounds providing final shaped articles having excellent surface appearance due to a reduction of tiger stripes combined with a substantial reduction of the number of gels.

Accordingly, it is provided a masterbatch composition comprising:

70-90% wt of a component A) being a propylene homopolymer or copolymer of propylene with ethylene or $C_4$-$C_{10}$ alpha olefins, having a $MFR^A$ according to ISO 1133 (230° C./2.16 Kg) ranging from 15 to 70 g/10 min; and 10-30% wt of a component B) being a propylene-ethylene copolymer comprising 25-45% wt of ethylene derived units and having a value of the intrinsic viscosity [η] of the fraction soluble in xylene at room temperature ranging from 5 to 9 dl/g, said masterbatch composition having a total MFR higher than 4 g/10 min, and a value of the flexural modulus measured according to ISO method 178 ranging from 950 to 2000 MPa.

All the percentages being referred to the sum of (A) and (B). Preferably, the amount of component A) ranges from 74 to 86% wt, while the component B) is preferably present in an amount ranging from 14 to 26% wt and its content of ethylene derived units preferably ranges from 30 to 42% wt. More preferably the intrinsic viscosity [η] of the component (B) ranges from 6.5 to 8 dl/g.

Preferably, the $MFR^A$ of component (A) ranges from 20 to 60 g/10 min, while the MFR of the total composition is preferably comprised between 4 and 15 g/10 min, more preferably between 6 and 10 g/10 min. According to a preferred embodiment, the flexural modulus of the total composition measured according to ISO method 178 ranges from 1000 to 1700 MPa. Moreover, it is a preferred feature for the masterbatch composition of the present invention that of having the P.I. (Polydispersity Index) of component (A) higher than 5, preferably ranging from 5 to 10, and more preferably from 5.5 to 9. The polydispersity index refers to the breath of the molecular weight distribution of component (A) measured according to the rheological method described in the characterization section. Values of PI higher than 5 are indicative of component (A) having a broad molecular weight distribution (MWD). Such a broad MWD can be in general obtained either by using a catalyst component able in itself to produce polymers with broad MWD or by adopting specific processes, such as polymerization in multiple step under different conditions, allowing to obtain polymer fractions having different molecular weight. In a preferred aspect of the invention the propylene homopolymer or copolymer can contain two or more fractions having different MFR.

The component (A) can contain ethylene and/or $C_4$-$C_{10}$ derived units in an amount ranging from 0.1 to 10% wt, preferably from 0.5 to 5% wt with respect to the amount of the copolymer A).

The compositions of the invention have an optimal balance between rigidity and impact strength as evidenced by a value of Izod impact resistance at 23° C. ranging from 5 to 100 KJ/m², preferably from 5 to 60 KJ/m², more preferably from 8 to 50 KJ/m². The value of Izod impact resistance at −20° C. ranges from 3 to 20 KJ/m², preferably from 3.5 to 10 KJ/m².

The masterbatch composition of the present invention can be prepared by a sequential polymerization, comprising at least two sequential steps, wherein components A) and B) are prepared in separate subsequent steps, operating in each step, except the first step, in the presence of the polymer formed and the catalyst used in the preceding step. In particular, the component (A) can require one or more sequential steps.

When produced in one step, the component A) has a molecular weight distribution of monomodal type. When produced in two or more steps, it can have a molecular weight distribution of monomodal type if the same polymerization conditions are maintained in all the polymerization steps or it can have a multimodal molecular weight distribution by differentiating the polymerization conditions among the various polymerization stages for example by varying the amount of molecular weight regulator.

The polymerization, which can be continuous or batch, is carried out according to known techniques operating either in liquid phase or in gas-phase, with a mixed liquid-gas technique. The liquid phase polymerization can be a slurry polymerization carried out in the presence of an inert solvent or a bulk polymerization in which the liquid medium is constituted by the liquid monomer.

The said polymerizations are preferably carried out in the presence of well known stereospecific Ziegler-Natta catalysts. Preferably, the catalyst system used to prepare the polymer composition of the invention comprises (A) a solid catalyst component comprising a titanium compound having at least one titanium-halogen bond, and an electron-donor compound, both supported on a magnesium halide and (B) an organoaluminum compound, such as an aluminum alkyl compound, as a co-catalyst. An external electron donor compound as a further component (C) is optionally added.

The catalysts generally used in the process of the invention are capable of producing polypropylene with an isotactic index greater than 90%, preferably greater than 95%. Suitable catalysts systems are described in the European patents EP45977, EP361494, EP728769, EP 1272533 and in the international patent application WO00/63261.

The solid catalyst components used in said catalysts comprise, as electron-donors (internal donors), compounds selected from the group consisting of ethers, ketones, and esters of mono- and dicarboxylic acids.

Particularly suitable electron-donor compounds are phthalic acid esters, such as diisobutyl, dioctyl, diphenyl and benzylbutyl phthalate.

Further preferred electron-donor compounds are selected from succinates, preferably from succinates of formula (I) below:

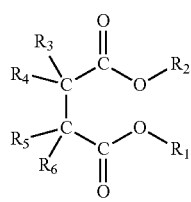

wherein the radicals $R_1$ and $R_2$, equal to, or different from, each other are a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to, or different from, each other, are hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle; with the proviso that when $R_3$ to $R_5$ are contemporaneously hydrogen $R_6$ is a radical selected from primary branched, secondary or tertiary alkyl groups, cycloalkyl, aryl, arylalkyl or alkylaryl groups having from 3 to 20 carbon atoms, or a linear alkyl group having at least four carbon atoms optionally containing heteroatoms;

The preparation of the above mentioned catalyst components is carried out according to various methods.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2 \cdot pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the internal electron donor is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44001. The solid catalyst components obtained according to the above method show a surface area (by B.E.T. method) generally between 20 and 500 m²/g and preferably between 50 and 400 m²/g, and a total porosity (by B.E.T. method) higher than 0.2 cm³/g preferably between 0.2 and 0.6 cm³/g. The porosity (Hg method) due to pores with radius up to 10.000 Å generally ranges from 0.3 to 1.5 cm³/g, preferably from 0.45 to 1 cm³/g.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The reactions described above result in the formation of a magnesium halide in active form. Other reactions are known in the literature, which cause the formation of magnesium halide in active form starting from magnesium compounds other than halides, such as magnesium carboxylates.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

The Al-alkyl compound is generally used in such a quantity that the Al/Ti ratio be from 1 to 1000.

Preferred external electron-donor compounds include silicon compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-methyl-dimethoxysilane. The external electron donor compound is used in such an amount to give a molar ratio between the organo-aluminum compound and said electron donor compound of from 0.1 to 500.

As mentioned above, the polymerization process can be carried out in gas phase and/or in liquid phase. As an example, it is possible to carry out the polymerization of the propylene polymer (A) in liquid phase, using liquid propylene as diluent, while the copolymerization stage to obtain the propylene copolymer fraction (B) can be carried out in gas phase, without intermediate stages except for the partial degassing of the monomers. Alternatively, all the sequential polymerization stages can be carried out in gas phase. The reaction time, temperature and pressure of the polymerization steps are not critical, however the temperature for the preparation of fraction (A) and (B), that can be the same or different, is usually from 50° C. to 120° C. The polymerization pressure preferably ranges from 0.5 to 12 MPa if the polymerization is carried out in gas-phase. The catalytic system can be pre-contacted (pre-polymerized) with small amounts of olefins. The molecular weight of the propylene polymer composition is regulated by using known regulators, such as hydrogen.

Preferably, the component A) is produced by a polymerization process carried out in liquid phase as described in the European Patent application no. EP 1901922 or by a gas phase polymerization process carried out in at least two interconnected polymerization zones as described in WO 02/051912.

Even if the order of the preparation of the components A) and B) is not important, preferably the component B) is produced after the component A) in a subsequent fluidized According to a preferred embodiment, the propylene polymer (A) is produced by a gas-phase polymerization process carried out in at least two interconnected polymerization zones. Said polymerization process is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

In the second stage of the particularly preferred polymerization process, the propylene/ethylene copolymer (B) is produced in a conventional fluidized-bed gas-phase reactor in the presence of the polymeric material and the catalyst system coming from the preceding polymerization step. The polymerization mixture is discharged from the downcomer to a gas-solid separator, and subsequently fed to the fluidized-bed gas-phase reactor operating under conventional conditions of temperature and pressure.

The propylene polymer compositions of the present invention can also be obtained by separately preparing the said copolymers (A) and (B), operating with the same catalysts and substantially under the same polymerization conditions as previously illustrated and subsequently mechanically blending said copolymers in the molten state using conventional mixing apparatuses, like twin-screw extruders.

bed gas-phase reactor.

The masterbatch composition of the present invention can also contain additives commonly employed in the art, such as antioxidants, light stabilizers, heat stabilizers, colorants and fillers.

As previously said, the masterbatch composition of the present invention can be advantageously compounded with additional polyolefins, in particular propylene polymers such as propylene homopolymers, random copolymers, and thermoplastic elastomeric polyolefin compositions.

Accordingly, another embodiment of the invention relates to a thermoplastic polyolefin composition suitable for injection molding, containing the above-defined masterbatch compositions. Preferably, the said thermoplastic polyolefin composition comprises up to 30% by weight, preferably from 8% to 25% by weight, more preferably from 10 to 20% by weight of the masterbatch composition according to the present invention.

Practical examples of the polyolefins to which the masterbatch is added (i.e. the polyolefins other than those present in the masterbatch) are the following polymers:

1) crystalline propylene homopolymers, in particular isotactic or mainly isotactic homopolymers;
2) crystalline propylene copolymers with ethylene and/or a $C_4$-$C_{10}$ α-olefin, wherein the total comonomer content ranges from 0.05 to 20% by weight with respect to the weight of the copolymer, and wherein preferred α-olefins are 1-butene; 1-hexene; 4-methyl-1-pentene and 1-octene;
3) crystalline ethylene homopolymers and copolymers with propylene and/or a $C_4$-$C_{10}$ α-olefin, such as HDPE;
4) elastomeric copolymers of ethylene with propylene and/or a $C_4$-$C_{10}$ α-olefins, optionally containing minor quantities of a diene, such as butadiene, 1,4-hexadiene, 1,5-hexadiene and ethylidene-1-norbornene, wherein the diene content is typically from 1 to 10% by weight;
5) a thermoplastic elastomeric composition comprising one or more of propylene homopolymers and/or the copolymers of item 2) and an elastomeric moiety comprising one or more of the copolymers of item 4), typically prepared according to known methods by mixing the components in the molten state or by sequential polymerization, and generally containing the said elastomeric moiety in quantities from 5 to 80% by weight.

The polyolefin composition can be produced by mixing the masterbatch composition and the additional polyolefin(s) together, extruding the mixture, and pelletizing the resulting composition using known techniques and apparatus.

The polyolefin composition may also contain conventional additives such as mineral fillers, colorants and stabilizers. Mineral fillers that can be included in the composition include talc, $CaCO_3$, silica, such as wollastonite ($CaSiO_3$), clays, diatomaceous earth, titanium oxide and zeolites. Typically the mineral filler is in particle form having an average diameter ranging form 0.1 to 5 micrometers.

The present invention also provides final articles, such as bumpers and fascia, made of the said polyolefin composition.

The practice and advantages of the present invention are disclosed below in the following examples. These Examples are illustrative only, and are not intended to limit the allowable scope of the invention in any manner whatsoever.

The following analytical methods are used to characterize the polymer compositions.

Melt Flow Rate: ASTM-D 1238, condition L.
[η] intrinsic viscosity: determined in tetrahydronaphtalene at 135° C.
Ethylene content: I.R. Spectroscopy.
Flexural Modulus: ISO 178
Strength at yield: ISO 527
Strength at break: ISO 527
Elongation at break and at yield: ISO 527
Notched IZOD impact test: ISO 180/1A
Polydispersity index (P.I.)

Determined at a temperature of 200° C. by using a parallel plates rheometer model RMS-800 marketed by RHEOMETRICS (USA), operating at an oscillation frequency which increases from 0.1 rad/sec to 100 rad/sec. The value of the polydispersity index is derived from the crossover modulus by way of the equation:

$$P.I.=10^5/Gc$$

in which Gc is the crossover modulus defined as the value (expressed in Pa) at which G'=G" wherein G' is the storage modulus and G" is the loss modulus.

Xylene Soluble Fraction 2.5 g of polymer and 250 cm³ of xylene are introduced in a glass flask equipped with a refrigerator and a magnetic stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

Tiger Stripes Ratio

The effect of the composition in reducing the tiger stripes is determined by evaluation of the Tiger stripes ratio which is calculated after injecting molten polymer into the center of a hollow spiral mold. The ratio is expressed by the distance between the injection point and the first stripe visible in the solidified polymer, divided by the total length of the spiral of solidified polymer. The evaluation has been carried out with a Krauss-Maffei KM250/1000C2 machine working under the following conditions.

Melt Temperature: 230° C.
Mould Temperature: 50° C.
Injection Pressure: 180 bar
Average Injection Speed: 10 mm/s
Change-over Pressure: 100 bar
Holding Pressure: 28 bar
Holding Pressure Time: 15 s
Cooling Time: 20 s
Thickness of the spiral 2.0 mm
Width of the spiral 50.0 mm
Clamping force: 2500 kN The effectiveness of the composition of the invention in reducing the tiger stripes was evaluated by determining its effect on a standard formulation which was obtained by mixing a certain amount of the masterbatch composition of the invention together with the other components shown in Table 1. These compounds were prepared in an internal mixer.

TABLE 1

| Injection Molding composition | |
|---|---|
| Propylene homopolymer (% wt) | 40 |
| Ethylene copolymer (% wt) | 28 |
| Filler (natural talc) (% wt) | 20 |
| Masterbatch composition of invention/comparative | 12 |

The ethylene copolymer contains one or more $C_3$-$C_{10}$ α-olefins as comonomer and has an intrinsic viscosity η of 1.85 dl/g.

Gels evaluation: qualitative evaluation by observing the surface appearance of bumpers and by counting the number of gels on the plaques.

EXAMPLE 1

Preparation of the Solid Catalyst Component

Into a 500 mL four-necked round flask, purged with nitrogen, 250 mL of $TiCl_4$ were introduced at 0° C. While stirring, 10.0 g of microspheroidal $MgCl_2.2.8C_2H_5OH$ (prepared according to the method described in ex. 2 of U.S. Pat. No. 4,399,054 but operating at 3000 rpm instead of 10000 rpm) and 7.4 mmol of diethyl 2,3-diisopropylsuccinate were added. The temperature was raised to 100° C. and maintained for 120 min. Then, the stirring was discontinued, the solid product was allowed to settle and the supernatant liquid was siphoned off. Then 250 mL of fresh $TiCl_4$ were added. The mixture was reacted at 120° C. for 60 min and, then, the supernatant liquid was siphoned off. The solid was washed six times with anhydrous hexane (6×100 mL) at 60° C.

Catalyst System and Prepolymerization Treatment

Before introducing it into the polymerization reactors, the solid catalyst component described above is contacted at 12° C. for 24 minutes with aluminum triethyl (TEAL) and dicyclopentyldimethoxysilane (DCPMS) in such quantity that the weight ratio of TEAL to the solid catalyst component be equal to 11, and the weight ratio TEAL/DCPMS be equal to 4.4.

The catalyst system is then subjected to prepolymerization by maintaining it in suspension in liquid propylene at 20° C. for about 5 minutes before introducing it into the first polymerization reactor.

Polymerization

The composition was prepared conducted in continuous mode in a series of three reactors equipped with devices to transfer the product from one reactor to the one immediately next to it. Component (A) was prepared in the first and second reactor bulk loop reactors operating under the same polymerization conditions, while the component (B) was prepared in the third conventional fluidized bed gas phase reactor. Into the liquid monomer loop polymerization reactors the propylene homopolymer (component (A)) was produced by feeding separately in a continuous and constant flow the catalyst component in a propylene flow, the aluminum triethyl (TEAL), and dicyclopentyldimethoxysilane as external donor, hydrogen (used as molecular weight regulator) according to the conditions reported in Table 1.

The polypropylene homopolymer produced in the first reactor was discharged in a continuous flow and, after having been purged of unreacted monomers, was introduced, in a continuous flow, into the gas-phase polymerization reactor, together with quantitatively constant flow of hydrogen, ethylene and propylene in the gas state to produce a propylene/ethylene copolymer (component (B)).

The polymer particles exiting the final reactor were subjected to a steam treatment to remove the reactive monomers and volatile substances, and then dried.

The so obtained composition was subject to mechanical characterization the results of which are reported in Table 1. Moreover, in order to evaluate its effectiveness as tiger stripe corrector, it was subject to the test under the conditions disclosed in the characterization section. The results are reported in Table 2.

EXAMPLE 2

The same catalyst described in example 1 was used.

The composition was prepared conducted in continuous mode in a series of four reactors equipped with devices to transfer the product from one reactor to the one immediately next to it. Component (A) was prepared in the first and second reactor bulk loop reactors operating under the same polymerization conditions, and in the first fluidized bed gas-phase reactor. The component (B) was prepared in the second fluidized bed gas-phase reactor. Into the liquid monomer loop polymerization reactors the propylene homopolymer (component (A)) was produced by feeding separately in a continuous and constant flow the catalyst component in a propylene flow, the aluminum triethyl (TEAL), and dicyclopentyldimethoxysilane as external donor, hydrogen (used as molecular weight regulator) according to the conditions reported in Table 1.

The polypropylene homopolymer produced in the bulk loop reactors was discharged in a continuous flow and was introduced, in a continuous flow, into the first gas-phase polymerization reactor, together with quantitatively constant flow of hydrogen, and propylene in the gas state to produce another fraction of propylene homopolymer having different molecular weight.

The polypropylene homopolymer produced in the first gas-phase reactor was discharged in a continuous flow and, after having been purged of unreacted monomers, was introduced, in a continuous flow, into the second gas-phase polymerization reactor, together with quantitatively constant flow of hydrogen, ethylene and propylene in the gas state to produce propylene/ethylene copolymer (component (B)).

The polymer particles exiting the final reactor were subjected to a steam treatment to remove the reactive monomers and volatile substances, and then dried.

The so obtained composition was subject to mechanical characterization the results of which are reported in Table 1. Moreover, in order to evaluate its effectiveness as tiger stripe corrector, it was subject to the test under the conditions disclosed in the characterization section. The results are reported in Table 2.

TABLE 2

|  | Example | | | |
|---|---|---|---|---|
|  | 1 | | 2 | |
| Liquid phase polymerization | $1^{st}$ loop | $2^{nd}$ loop | $1^{st}$ loop | $2^{nd}$ loop |
| T (° C.) | 70 | 70 | 67 | 67 |
| $H_2$ feed conc (mol ppm) | 3400 | 3400 | 2200 | 20000 |
| MFR (g/10') |  | 25 |  | 43 |
| PI |  | 6.3 |  | 7.3 |
| XI |  | 96.9 |  | 96.1 |
| Mw/Mn |  | 12.2 |  | 13.2 |
| Gas-phase propylene homopolymerization |  |  | $1^{st}$ GPR | |
| T (° C.) | — | — | 80 | |
| $H_2$ (mol %) | — | — | 0.5 | |
| MFR (g/10') | — | — | 30 | |
| PI | — | — | 7.1 | |
| XI | — | — | 97.6 | |
| Mw/Mn | — | — | 17.3 | |
| Gas-phase ethylene/propylene copolymerization | $2^{nd}$ GPR | | $2^{nd}$ GPR | |
| T (° C.) | 75 | | 75 | |
| P (barg) | 16 | | 20 | |
| $H_{2\ (mol\ ppm)}$ | 0 | | 320 | |
| C2 (mol %) | 15 | | 15 | |
| % wt of copolymer B | 12 | | 21 | |
| % wt C2 copolymer B | 35 | | 32 | |
| Final Composition |  |  |  |  |
| MFR | 9.7 | | 5.9 | |
| C2% total | 4.2 | | 6.7 | |
| XS | 13.5 | | 21.8 | |
| XS-IV | 7.16 | | 7.41 | |
| Characterization ISO |  |  |  |  |
| Flexural modulus (MPa) | 1450 | | 1281 | |
| Izod 23° C. (KJ/m$^2$) | 8.4 | | 12.6 | |
| Izod 0° C. (KJ/m$^2$) | 4.2 | | 5.2 | |
| Elong.@break (%) | 765 | | 730 | |

TABLE 2-continued

|  | Example | | |
| --- | --- | --- | --- |
|  | 1 | 2 | Comp. 1 |
| Tiger stripes evaluation (cm/cm) | 0.605 | 0.638 | 0.7 |
| Gels evaluation | No big; Sporadic medium | No big; Sporadic medium | Few big gels; Many medium gels |

Note:
the Injection molding composition of comparative example 1 was prepared following the same recipe described in the characterization section using as tiger stripes corrector the heterophasic composition disclosed in example 4 of WO2004/087805.

The invention claimed is:

1. A masterbatch composition comprising:
(A) 74-86 wt. %, based upon the total weight of the masterbatch composition, of a component (A) being a propylene homopolymer or a copolymer of propylene with ethylene or $C_4$-$C_{10}$ alpha olefins, having a polydispersity index from 5 to 10, and an $MFR^A$ according to ISO 1133 (230° C./2.16 kg) ranging from 20 to 60 g/10 min; and
(B) 14-26 wt. %, based upon the total weight of the masterbatch composition, of a component (B) being a propylene-ethylene copolymer comprising 30-42 wt. %, based upon the total weight of the propylene-ethylene copolymer, of ethylene derived units and having a value of the intrinsic viscosity [η] of the fraction soluble in xylene at room temperature ranging from 5 to 9 dl/g, said masterbatch composition having a total MFR from 5.9 to 9.7 g/10 min, an Izod impact resistance at 23° C. ranging from 8.4 to 12.6 kJ/m², an Izod impact resistance at 0° C. ranging from 4.2 to 5.2 kJ/m², a value of the flexural modulus measured according to ISO method 178 ranging from 1100 to 1450 MPa and an elongation at break value measured according to ISO method 527 ranging from 730 to 765%.

2. The masterbatch composition of claim 1 wherein the intrinsic viscosity [η] of the component (B) ranges from 6.5 to 8 dl/g.

3. A thermoplastic polyolefin composition comprising the masterbatch composition of claim 1.

4. Articles comprising the thermoplastic polyolefin composition of claim 3.

* * * * *